United States Patent
Elliott et al.

(10) Patent No.: US 7,340,551 B2
(45) Date of Patent: Mar. 4, 2008

(54) BRIDGE PERMITTING ACCESS BY MULTIPLE HOSTS TO A SINGLE PORTED STORAGE DRIVE

(75) Inventors: Robert C. Elliott, Houston, TX (US); Hubert E. Brinkmann, Jr., Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 136 days.

(21) Appl. No.: 11/274,607

(22) Filed: Nov. 15, 2005

(65) Prior Publication Data

US 2006/0106997 A1    May 18, 2006

Related U.S. Application Data

(60) Provisional application No. 60/627,841, filed on Nov. 15, 2004.

(51) Int. Cl.
    *G06F 13/36*    (2006.01)
(52) U.S. Cl. .................. 710/309; 710/310; 711/147

(58) Field of Classification Search ............... 710/306, 710/309–310, 200, 240; 711/147
See application file for complete search history.

(56) References Cited

U.S. PATENT DOCUMENTS 6,792,497 B1 * 9/2004 Gold et al. ................. 710/317
2005/0186832 A1   8/2005 Nemazie

OTHER PUBLICATIONS

LSI Logic and Seagate Technology, "SAS: The Path to Maximum SATA Scalability," Oct. 2004, 7 pp.
Rob Elliott, Compaq Computer Corporation, "Shiner Bock," Oct. 8, 2001, 43 pp.
Rob Elliott, Compaq Computer Corporation, "Serial Attached SCSI," Mar. 3, 2002, 124 pp.

* cited by examiner

*Primary Examiner*—Clifford Knoll

(57) ABSTRACT

A bridge comprises an interface to a plurality of hosts, an interface to a single-ported storage drive and arbitration logic. The arbitration logic controls and permits concurrent access by the hosts to the single-ported storage drive so that the bridge need not store read or write data being received from or provided to the storage drive.

22 Claims, 4 Drawing Sheets

BRIDGE PERMITTING ACCESS BY MULTIPLE HOSTS TO A SINGLE PORTED STORAGE DRIVE

CROSS-REFERENCE TO A RELATED APPLICATION

The present application claims the benefit of, and incorporates by reference, provisional application Ser. No. 60/627,841, filed Nov. 15, 2004, and entitled "Dual-Active STP/SATA Bridge."

BACKGROUND

Some types of storage drives are single-ported meaning that only one host at a time can access the drive. When one host has completed its read or write transaction with the drive, another host may then be granted access to the drive. A serial AT attachment (SATA) drive is an example of such a drive. While generally adequate for certain applications, a single-ported drive, as noted above, cannot be accessed by more than one host at a time, thereby providing a performance bottleneck in systems containing multiple hosts.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers broadly to a collection of two or more components and may be used to refer to an overall system (e.g., a computer system or a network of computers) as well as a subsystem provided as part of a larger system (e.g., a subsystem within an individual computer).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
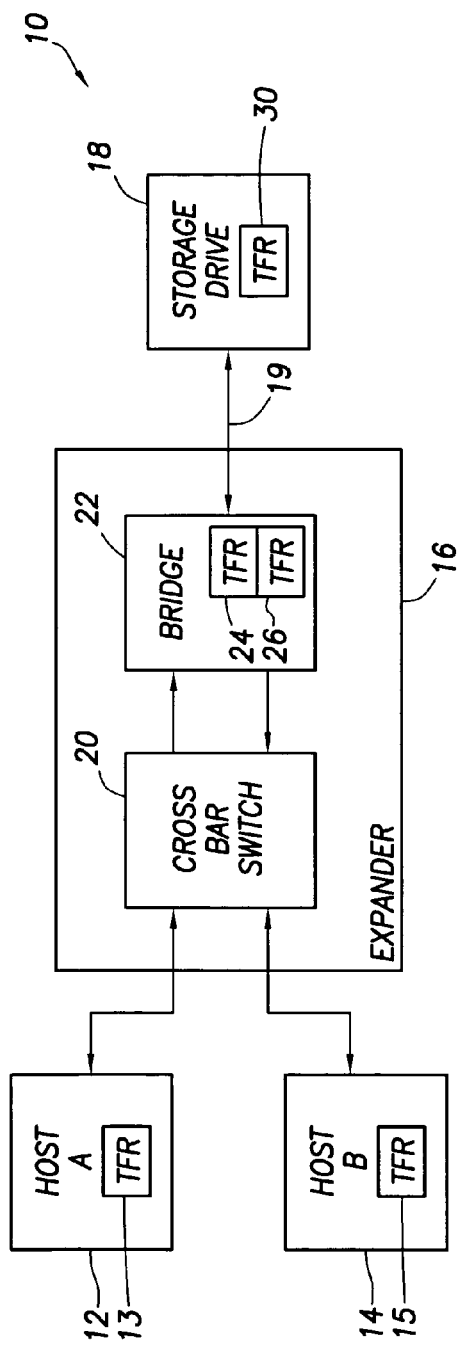
FIG. 1 shows a block diagram of a system in accordance with embodiments of the invention and comprising a bridge that includes multiple shadow task file register sets.

FIG. 1 shows an embodiment of a system 10 comprising a plurality of hosts 12 and 14, an expander 16, and a storage device 18. The hosts 12, 14 (also designated herein as host A and host B), access the storage drive 18 through the expander 16. Each host 12, 14 may comprise a separate computer (e.g., a server), or a separate host bus adapter within a computer. A host bus adapter functions to couple a host to one or more expanders and/or one or more storage devices. For example, the hosts 12, 14 may comprise two host bus adapter cards installed in a computer. In other embodiments, the hosts 12, 14 may comprise separate host bus adapters resident within a single computer. The term "host" broadly refers to any hardware or software entity that can read data from and/or write data to the storage drive 18 independent of another host.

The storage drive 18 comprises any suitable type of non-volatile storage medium such as a hard disk drive, compact disc read only memory (CD ROM) drive, tape drive, etc. In some embodiments, the storage drive 18 comprises a single storage device, but in other embodiments, the storage drive comprises multiple storage devices. For purposes of this disclosure, the term "storage drive" includes one or more storage devices.

The storage drive 18 comprises a single-ported drive meaning that only one host at a time can access the drive. The single-ported nature of the storage drive 18 is denoted by the single arrow 19 coupling the expander 16 and storage drive 18. In at least some embodiments, the storage drive 18 comprises a SATA drive. A SATA drive cannot determine the identity of a host that issues read or write transactions to the drive. So as not to confuse a SATA drive, only one host at a time typically can access the drive. In such systems, each host typically is granted exclusive access (sometimes referred to as an "affiliation") to the storage drive. A host must release its affiliation before another host can access the storage drive. The drive 18 includes a task file register (TFR) 30 that a host can write with commands such as read commands, write commands, etc. Each of the hosts 12 and 14 includes a shadow copy of the drive's TFR as TFRs 13 and 15 which are synchronized to the drive's TFR 30. Each host reads its own shadow TFR when determining when to communicate to the drive. In accordance with embodiments of the invention, the expander 16 includes a second set of shadow TFRs 24 and 26. Each shadow TFR 24, 26 is generally synchronized to a corresponding hosts TFR 13, 15. In at least one embodiment, the bridge 22 within the expander 16 includes storage for the TFRs 24, 26. The use of the TFRs 24, 26 to coordinate communications between multiple hosts 12, 14 and a single-ported drive will be explained in further detail below.

In accordance with conventional SATA rules (in systems that do not contain a bridge 22 as described herein), a drive sends updates of its TFR to a host by way of a "Device-to-Host Register FIS" (a FIS is a frame instruction structure and is discussed below), and the host sends updates of its TFR to the drive with a Host-to-Device Register FIS. To avoid race conditions, the devices (host or drive) that transmit TFR updates coordinate amongst themselves who "owns" the TFR at any time. For example, when communications between the host and drive are idle, the host "owns" the TFR. When the host sends a command to the drive, the host sends the Host-to-Device Register FIS which contains both the command details and changes a bit (e.g., a BSY bit) so that the drive now owns the TFR. The drive is now entitled to send a Register FIS when appropriate.

In accordance with embodiments of the invention, the bridge 22 is coupled between the drive 18 and host 12, 14. To the drive 18, the bridge 22 functions as a host in terms of TFR coordination. Similarly, to the host, the bridge 22 functions as a drive 18. When the host 12, 14 sends a Register FIS to the drive 18 to update the TFR 30 in the drive, the bridge 22 receives the FIS and eventually forwards it to the drive 18. When the drive 18 sends a Register FIS to the host to update the TFR 13, 15 in the host, the bridge 22 receives the FIS and eventually forwards it to the host.

The embodiments of the present invention comprise logic that permits multiple hosts to access a single-ported drive 18 concurrently meaning that each such host may be granted exclusive access at the same time. The logic noted above coordinates access to the single-ported drive storage on behalf of multiple hosts in such a way that permits each of the multiple hosts to have an affiliation at the same time. As a result of the logic disclosed herein, the drive responds to concurrent access requests from multiple hosts without having to coordinate and ensure that responses are provided back to the correct host; the logic disclosed below takes care of that coordination.

Referring to FIG. 1, the expander 16 comprises a cross-bar switch 20 and a bridge 22. The expander 16 may be packaged in a common housing with the storage 18 or in a separate housing from the storage drive. The expander 16 functions to permit two or more hosts to access the single-ported storage drive 18. The cross-bar switch 20 enables one or the other host 12, 14 to have access through the expander's bridge 22 to the host. The bridge 22 coordinates access to the single-ported storage drive 18 as explained below. In accordance with at least one embodiment of the invention, the hosts 12, 14 and drive 18 communicate with each other passing frame information structures (FISes) back and forth. A FIS, also referred to as a "frame," comprises various information that identifies the nature of the message (e.g., a DMA read, a DMA write, a data frame, etc.). FISes in accordance with the SATA specification may be used in the embodiments below.

Figure 2:
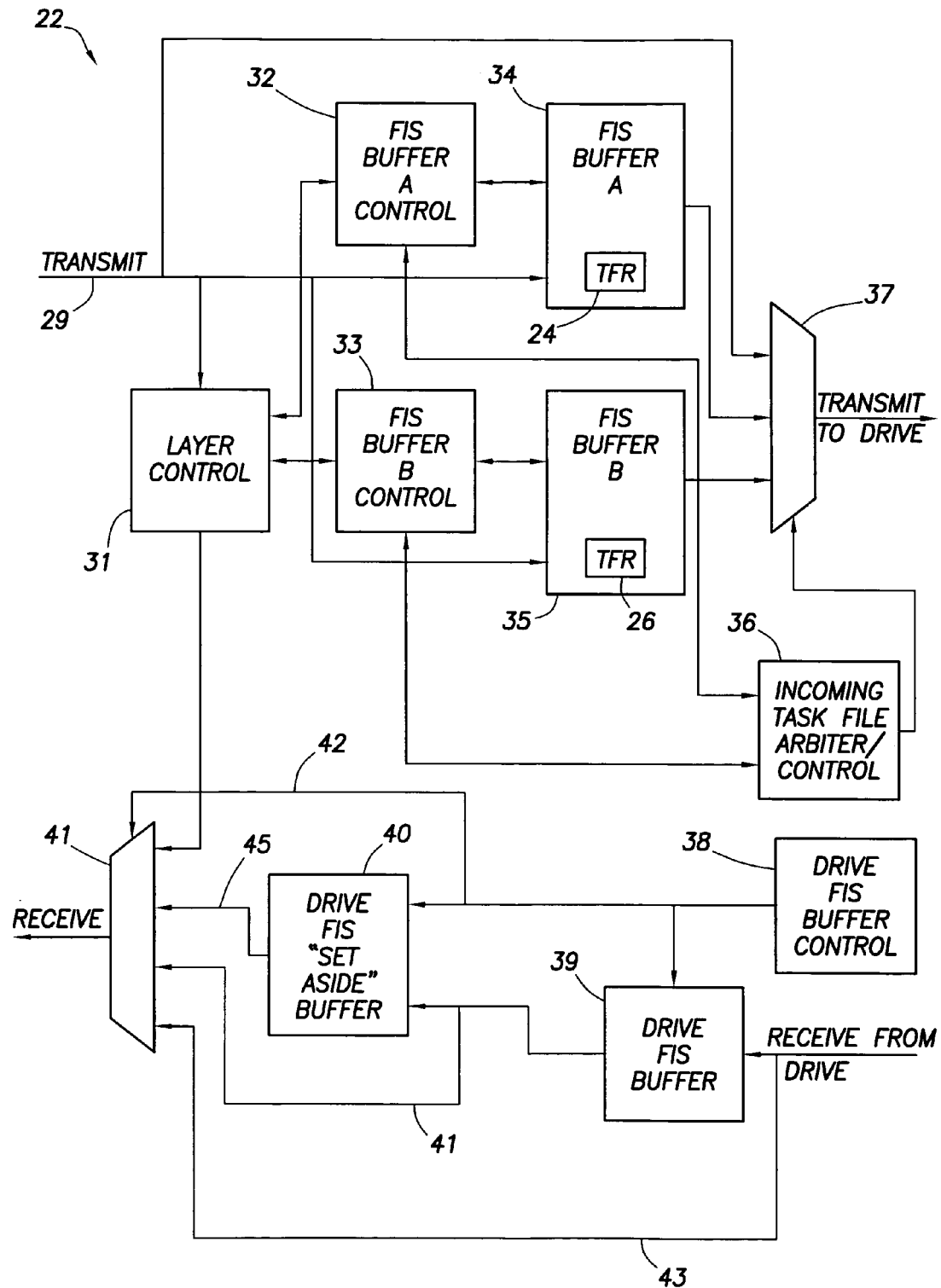
FIG. 2 shows a block diagram of the bridge of FIG. 1 in accordance with an embodiment of the invention.

FIG. 2 illustrates the bridge 22 in accordance with an embodiment of the invention. As shown, bridge 22 comprises a Serial Attached Small Computer System Interface (SAS) link (SL) layer control 31, a pair of FIS controls 32, 33, a pair of FIS buffers 34, 35, and an incoming task file arbiter control 36. The bridge 22 also comprises multiplexers 37 and 41, a drive FIS buffer control 38, a drive FIS buffer 39, and a drive FIS set aside buffer 40. Frames are received from either of the hosts through the cross-bar switch 20, over line 29 and are stored in a FIS buffer 34, 35 associated with that host. The bridge 22 depicted in FIG. 2 supports two hosts concurrently communicating with a drive, and thus the bridge includes two FIS buffers 34, 35 which include the TFRs 24 and 26 discussed above. If it is desired to concurrently support more than two hosts, more than two FIS buffers could be provided.

After a frame is stored in a buffer 34, 35, the frame will be forwarded on to the drive 18 through the multiplexer 37. The multiplexer 37 permits one frame at a time to be forwarded on to the drive in a controlled manner, as controlled by the incoming task file arbiter control 36. The FIS buffer controls 32 and 33 contain information about the state of each host. That information will be used by the incoming task file arbiter control 36 as explained below to enable the bridge 22 to coordinate the concurrent communication to the single-ported drive on behalf of multiple hosts.

In response to a frame (FIS) provided to the drive 18 by a specific host, the drive eventually will provide back a status or other type of frame. The response frame should thus be provided to the corresponding host. At least some frames that are received by the bridge from the storage drive 18 to be provided to the corresponding host are stored in the drive FIS buffer 39 and from the buffer 39 over line 41 to the multiplexer 41 for transmission through the cross-bar switch 20 to the relevant host. Other frames are not stored in drive FIS buffer 39 and, instead, are provided directly to the multiplexer 41 over line 43 as shown. Still other frames are first stored in the drive FIS buffer 39 and then stored in the drive FIS set aside buffer 40 before being provided over line 45 to the multiplexer 41. Drive FIS buffer control 38 comprises arbitration logic that determines when such response frames should be provided to the host and to which specific host to send such frames. The drive FIS buffer control 38 asserts a control signal 42 to the multiplexer 41 to have the desired frame, either from the drive directly, the drive FIS buffer 39, or the drive FIS set aside buffer 40, provided through the multiplexer 41 to the host.

The bridge 22 thus comprises buffers 34 and 35 that temporarily store frames from corresponding hosts so that the bridge can coordinate the transfer of such frames to the drive. The bridge also comprises arbitration logic comprising, for example, the incoming task file arbiter control 36 which reads status information from FIS buffer controls 32 and 33 to determine which host's frames can be forwarded on to the drive 18. As for responsive communications (i.e., drive to host), the bridge 22 also comprises temporary buffers 39, 40 that enable the bridge to temporarily store frames from the drive that are destined for a host. The temporary buffers allow the bridge to inspect the FIS header and determine the host to which it is to send the FIS. Arbitration logic, such as the drive FIS buffer control 38, coordinates the transfer of responsive frames from the drive back to the corresponding host. Moreover, the bridge 22 comprises buffers and arbitration logic that enable the bridge to coordinate concurrent communications between multiple hosts and a single-ported drive 18 such that the drive need not be aware that it is communicating with multiple hosts concurrently. The arbitration logic is embued with, or otherwise makes arbitration decisions in accordance with, the logic illustrated in Table I discussed below. The buffers and logic also permit the multiple hosts to communicate in an efficient manner with a single drive 18.

In accordance with an embodiment of the invention, the bridge 22 coordinates or controls the access by a host 12, 14 to the bridge in such as way that the bridge need not store data being written to or read from the drive. Accordingly, the bridge 22 need not have storage capacity for such data. In such embodiments, for example, the FIS buffers 34, 35 are used to store the FIS information, but not the data payloads being provided to the drive 18. The bridge 22 operates in a manner that avoids the necessity of having sufficient memory for data payloads by controlling the hand-shaking that occurs between host and expander and between expander and drive to preclude the data from passing between drive and host until the arbitration logic determines that data frame can be passed through the bridge given communications that may be on-going between the drive and another host. In other embodiments, the expander 16

(e.g., the bridge 22) does include sufficient memory for buffering data payloads in route between host 12, 14 and drive 18.

Figure 3:
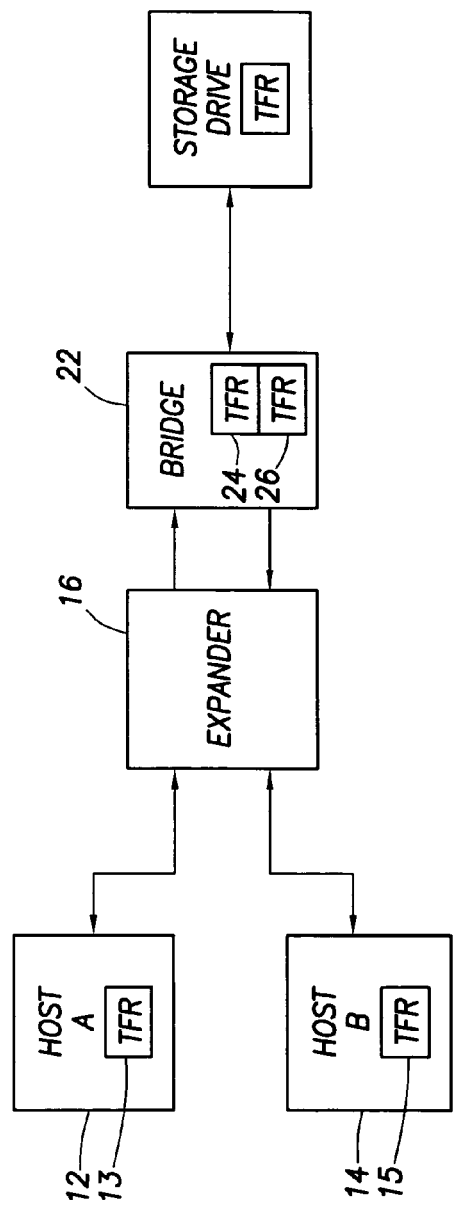
FIG. 3 shows an alternate embodiment of the invention.

In the embodiment of FIG. 1, the bridge 22 is implemented as part of the expander 16. FIG. 3 shows an alternative embodiment in which the bridge 22 is implemented separately from the expander 16.

Table I below illustrates the behavior of the bridge 22 when a command is received from a host. The behavior of the bridge is based on the status information contained in the TFRs 24 and 26 associated with the hosts. Table I illustrates the reaction of the bridge upon receipt of a command from host A in various situations. The same or similar logic would apply as well to the bridge 22 upon receipt of a command from host B in such situations.

Table I below refers to "queued" and "non-queued" commands that can be provided by a host 12, 14 to the drive 18. A queued command is a command that a host can have stored in a buffer (e.g., FIS buffer 34, 35) with other queued commands for subsequent retrieval and execution by the drive 18. A non-queued command is a command that is not permitted to be buffered with other commands and is provided directly the drive 18. Non-queued commands are executed by the drive, one at time, meaning that the drive executes a first non-queued command provided to it by the host, executes a second non-queued commands provided to by the host after completion of the first non-queued command, and so on. Examples of queued commands include READ FPDMA EXT and WRITE FPDMA EXT as provided in the SAS specification. Example of non-queued commands include IDENTIFY DEVICE and READ LOG EXT as in the SAS specification.

TABLE I

| Task file A status | Task file B status | Bridge Behavior Condition Host A command received | Behavior |
|---|---|---|---|
| Empty | Empty | Non-queued command X | Send command to the drive |
| Empty | Empty | Queued command X | Send command to the drive |
| Empty | Running non-queued command | non-queued command X | Wait for task file B's command to finish, then send command X to the drive |
| Empty | Running non-queued command | queued command X | Wait for task file B's command to finish, then send command X to the drive |
| Empty | Running queued command | non-queued command X | Wait for task file B's queued command to finish, then send command X to the drive. If any of B's commands fail, wait for B to clear the error and abort all the tasks. |
| Empty | Running queued command | queued command X | Send command X to the drive |
| Running queued command | Empty | non-queued command X | Host A expects all of its command to be aborted. Send command X to the drive and let host A respond on its own to error |
| Running queued command | Running queued command(s) | non-queued command X | Host A expects all of its command to be aborted. Host B does not expect command(s) to abort. Let all of B's commands complete but refuse to send new |

TABLE I-continued

| Task file A status | Task file B status | Bridge Behavior Condition Host A command received | Behavior |
|---|---|---|---|
| | | | commands from B. When B is finished, send command X to the drive. |

As can be seen from Table I above, if queued commands from host B are running to the storage drive 18 and host A attempts to perform its own queued command to the drive, the bridge 18 sends host A's queued command to the drive without requiring host B's FIS buffer 35 to empty of its queued commands. That is, the bridge 22 can send interleaved queued commands to the drive 18 from both hosts concurrently—a queued command stream from the bridge to the drive that comprises queued commands from multiple hosts. Although the drive is unable to distinguish one drive from another, the bridge keeps track of the source of each command so that it can provide return frames from the drive to the appropriate host. Referring again to Table I, if the bridge 22 receives a non-queued or queued command from host A while running non-queued commands from host B or receives a non-queued command from host A while running a queued command from host B, the bridge's arbitration logic causes the bridge to wait for host B's command(s) to finish before sending host A's commands to the drive. The bridge 22 causes any non-queued command from host A to wait by the bridge not completing an interaction with host A in which host A is attempting to provide the non-queued command. For example, host A may assert a signal indicating that it has a command to send to the drive and the bridge waits before responding with an acknowledgement to permit the command to be provided to the bridge.

Figure 4:
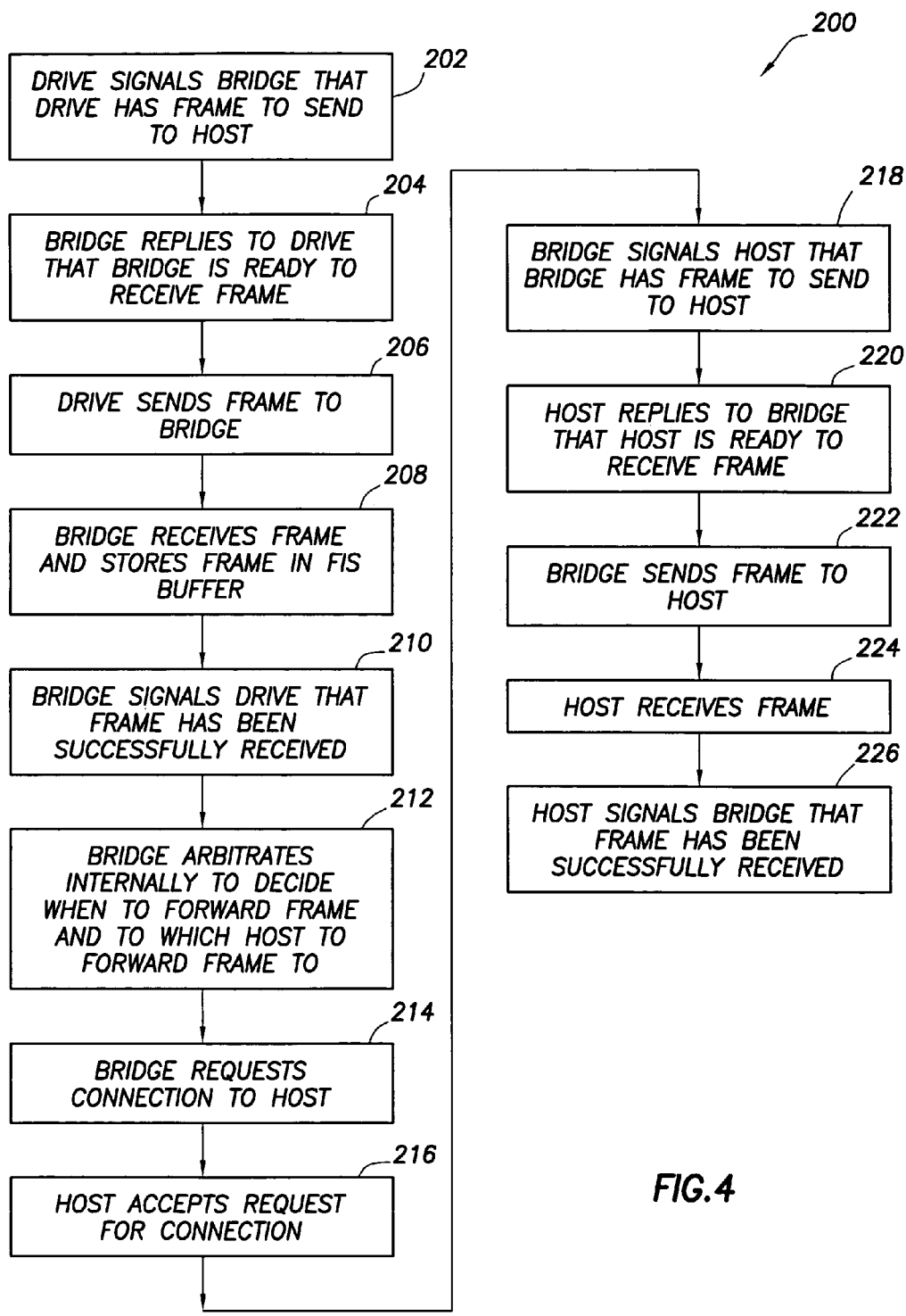
FIG. 4 shows an exemplary method that can be performed on the systems of FIGS. 1 and 3.

FIG. 4 illustrates a method 200 by which the storage drive 18 sends status information back to the initiating host (host A or host B in the example of FIG. 1) following receipt by the drive of a frame from the host. The drive 18, as noted above, comprises a single-ported drive in that the drive does not distinguish between multiple hosts. The bridge 22, however, comprises logic that permits multiple hosts to access the single-ported storage drive.

Reference should be made to method 200 of FIG. 4 as well as to the bridge embodiment FIG. 2. Method 200 comprises actions 202-226. Action 202 comprises the drive 18 signaling the bridge that the drive has a frame to send to the initiating host. The frame may contain status information for the initiating host based on a previous command sent to the drive 18 by the host. Action 202 may be performed by the drive asserting a signal such as an XRDY signal of the SATA specification, or equivalent signal of other specifications. The XRDY signal is a ready signal that indicates that the drive has a transaction to transmit. The references below to specific signal names are in accordance with the SATA specification, but these signals are merely exemplary of various embodiments. Other embodiments may include other signal names and logic implemented in accordance with specifications other than SATA. At 204, the bridge 22 replies that the bridge is ready to receive the frame from the drive 18. This action may be performed by the bridge asserting an RRDY signal. At 206, the drive 18 begins to send the frame to the bridge and, at 208, the bridge receives the frame and stores the frame in the appropriate FIS buffer. Once the bridge 22 has successfully received the frame, which may include checking for errors using cyclic redundancy check bits (CRC) in the communication of the frame to the bridge, the bridge signals the drive 18 (action 210) that the frame has been successfully received by the bridge.

Once the frame has been received by the bridge 22 and stored in the FIS buffer, the bridge then forwards the frame on to the appropriate host, that is, the host that sent the command frame that prompted the drive to send back the frame. At 212, arbitration logic, which at least in part comprises the STP SL layer control, arbitrates internally to decide when to forward the frame and to which host to forward the frame to. Once this arbitration is performed, the bridge 22 requests a connection to the appropriate host (action 214). The host, at 216, accepts the connection. The bridge then signals (action 218) the host that the bridge has a frame (i.e., the frame received from the drive 18) to send to the host. This action can be performed by the bridge asserting an XRDY signal to the host. The host replies at 220 (e.g., by asserting an RRDY signal) that the host is ready to receive the frame. The bridge then sends the frame to the host (222), the host receives the frame (224), and the host signals the bridge that the frame was received successfully received by the host (226).

Figure 5:
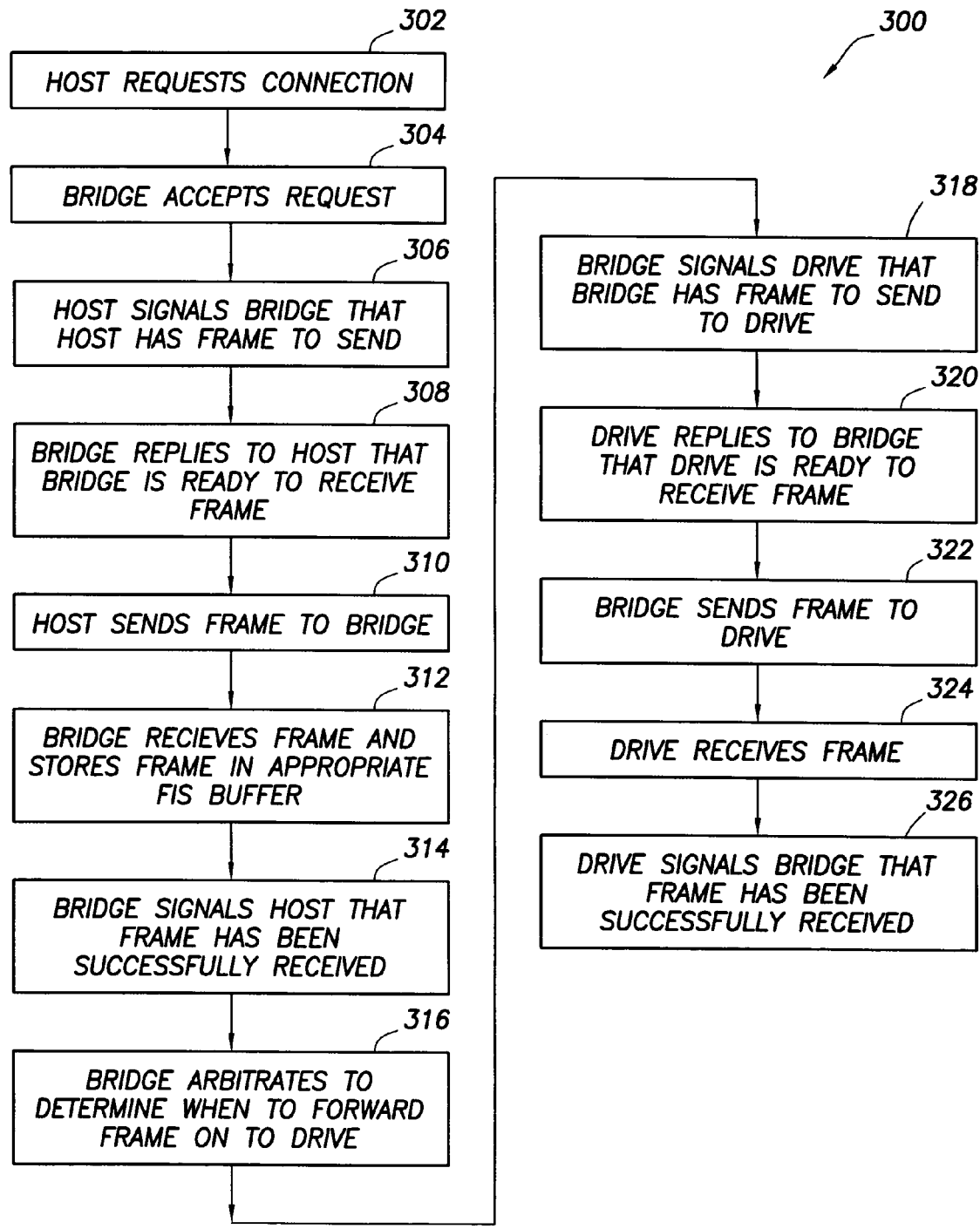
FIG. 5 shows an another exemplary method that can be performed on the systems of FIGS. 1 and 3.

FIG. 5 illustrates a method 300 by which the host sends a frame to a drive. Method 300 comprises actions 302-326 as shown. At 302, the host that has a frame to send, requests a connection by, for example, sending an OPEN address frame. The bridge 22 receives the connection request at 304. At 306, the host signals the bridge 22 (e.g., by asserting an XRDY signal) that the host has a frame to send. The bridge replies at 308 that the bridge is ready to receive the frame (e.g., by asserting an RRDY signal). At 310, the host sends the frame to the bridge, which the bridge receives and stores (action 312) in an appropriate FIS buffer. At 314, the bridge signals the host that the bridge successfully received the frame.

The bridge 22 then begins the process of forwarding the frame received from the host on to the storage drive 18. At 316, the bridge 22 arbitrates to determine when to forward the frame on to the drive. This action may be performed by the incoming task file/arbiter control (FIG. 2) in accordance with the limitations, for example of Table I above. Once the bridge's logic has determined that it is appropriate to send the frame from the FIS buffer to the storage drive 18, the bridge signals (action 318) the drive that the bridge has a frame to send the drive. This action can be performed by the bridge asserting an XRDY signal. The drive replies at 320 (e.g., by asserting an RRDY signal) that the drive is ready is ready to receive the frame. Actions 322-326 comprise the bridge sending the frame to the drive, the drive receiving the frame, and the drive then signaling the bridge of successful receipt of the frame (e.g., by asserting an RRDY signal).

In some embodiments, host A may desire to provide a non-queued command to the drive while host B is running a series of queued commands. As shown in Table I above, such a scenario will cause the bridge 22 to force host B's FIS buffer to provide all of its queued commands to the drive 18 for execution before permitting host A's non-queued command to be provided to the drive. The incoming task file arbiter control 36 effectuates this response and controls the multiplexer 37 so as to provide the appropriate commands from the appropriate buffers 34 and 35.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a single-ported storage drive; and
   a bridge coupled to said storage drive, said bridge comprising arbitration logic that controls and permits concurrent access by a plurality of hosts to said single-ported storage drive so that said bridge need not store read or write data being received from or provided to the storage drive;
   wherein said bridge comprises a plurality of shadow task file register sets, each shadow task file register set usable to store a command provided by a separate host, each command executed by said single-ported storage drive.

2. The system of claim 1 wherein the single-ported storage drive comprises a task file register set, the task file register set comprising at least one register that is used by a host to access said storage drive.

3. The system of claim 1 wherein, if a first host is currently accessing the storage drive and a second host signals the bridge that the second host has a transaction for the storage device, said bridge delays assertion of a ready signal to said second host until said first host has completed its access of said storage drive.

4. The system of claim 1 wherein based on a type of command one host is providing through the bridge to the storage drive, the arbitration logic causes a command from another host to be delayed.

5. The system of claim 1 wherein each host can send queued and non-queued commands through the bridge to the storage drive, the queued commands being buffered in the bridge and the non-queued commands not being buffered in the bridge, and wherein the bridge sends interleaved queued commands from the plurality of hosts to the drive.

6. The system of claim 1 wherein said single-ported drive performs commands from a plurality of hosts without being able to distinguish one host from another host.

7. The system of claim 1 wherein the bridge sends interleaved commands from the plurality of hosts to the single-ported storage drive.

8. A system, comprising:
   a single-ported storage drive comprising a task file register set, the task file register set comprising at least one register that is used by a host to access said storage drive; and
   a bridge coupled to said storage drive, said bridge comprising a plurality of shadow task file register sets, each shadow task file register set usable to store a command provided by a separate host, each command executed by said single-ported storage drive to thereby permit said single-ported storage drive to be accessed by multiple hosts.

9. The system of claim 8 wherein each of said multiple hosts can simultaneously have an open affiliation with said single-ported storage drive by use of the shadow task file register set associated with each such host, each open affiliation providing exclusive access for said host to said single-ported storage drive.

10. The system of claim 8 further comprising a plurality of hosts coupled to said bridge.

11. The system of claim 10 wherein each host comprises a shadow task file register set that the host uses when accessing its corresponding shadow task file register set included in the bridge.

12. The system of claim 8 wherein each shadow task file register set comprises state information pertaining to the storage drive.

13. The system of claim 8 further comprising a switch coupling the multiple hosts to said bridge and comprising handshake signals between said hosts and said bridge, wherein said bridge causes said handshake signals to a host to be controlled to preclude data from said host to be transmitted through said bridge to said storage device if another host is actively reading data from or writing data to said storage device.

14. The system of claim 8 wherein the bridge sends interleaved commands received from a plurality of hosts to the single-ported storage drive.

15. The system of claim 8 wherein the bridge forces a host to wait to complete the transmission of a command of a certain type to the bridge based on said type, wherein the command targets the single-ported storage drive.

16. A method implemented in a bridge coupling a plurality of hosts to a single-ported storage drive, comprising:
receiving a command in the bridge from a first host, said command to be executed by said drive;
determining a type of said command being received from the first host; and
forcing a command from a second host of a certain type to wait before being provided to the drive based on the type of command from the first host;
wherein said single-ported drive is unable to distinguish one host from another host.

17. The method of claim 16 further comprising interleaving and providing queued commands from the first and second hosts to the drive, wherein queued commands are temporarily stored in said bridge before being provided to the drive.

18. A system comprising:
means for receiving a command in a bridge from a first host, said command to be executed by a single-ported drive;
means for determining a type of said command received from said first host; and
means for forcing a command from a second host of a certain type to wait before being provided to the drive based on the type of command from the first host;
wherein said drive is unable to distinguish one host from another host.

19. The system of claim 18 further comprising means for interleaving and providing queued commands from the first and second hosts to the drive, wherein queued commands are temporarily stored in said bridge before being provided to the drive.

20. A bridge, comprising:
an interface to a plurality of hosts;
an interface to a single-ported storage drive;
arbitration logic that controls and permits concurrent access by said hosts to said single-ported storage drive so that said bridge need not store read or write data being received from or provided to the storage drive; and
a plurality of shadow task file register sets, each shadow task file register set associated with a corresponding task file register in a host and in the storage drive, and each shadow task tile register set usable to store commands from separate hosts, said commands to be executed by said storage drive.

21. The bridge of claim 20 wherein, if a first host is currently accessing the storage drive and a second host signals the bridge that the second host has a transaction for the storage device, the arbitration logic delays assertion of a ready signal to said second host until said first host has completed its access of said storage drive.

22. The bridge of claim 20 wherein the bridge sends interleaved commands from the plurality of hosts to the single-ported storage drive.

* * * * *

UNITED STATES PATENT AND TRADEMARK OFFICE
CERTIFICATE OF CORRECTION

| | | |
|---|---|---|
| PATENT NO. | : 7,340,551 B2 | Page 1 of 1 |
| APPLICATION NO. | : 11/274607 | |
| DATED | : March 4, 2008 | |
| INVENTOR(S) | : Robert C. Elliott et al. | |

It is certified that error appears in the above-identified patent and that said Letters Patent is hereby corrected as shown below:

In column 10, line 28, in Claim 20, delete "tile" and insert -- file --, therefor.

Signed and Sealed this

Twenty-second Day of July, 2008

JON W. DUDAS
*Director of the United States Patent and Trademark Office*